United States Patent
Gilbert et al.

(10) Patent No.: US 6,636,944 B1
(45) Date of Patent: Oct. 21, 2003

(54) ASSOCIATIVE CACHE AND METHOD FOR REPLACING DATA ENTRIES HAVING AN IO STATE

(75) Inventors: Bruce Michael Gilbert, Beaverton, OR (US); Robert J. Joersz, Portland, OR (US); Roger L. Shelton, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/850,660

(22) Filed: Apr. 24, 1997

(51) Int. Cl.[7] ............................................. G06F 13/00
(52) U.S. Cl. ................................. 711/133; 711/144
(58) Field of Search ....................... 711/133, 144, 711/159

(56) References Cited

U.S. PATENT DOCUMENTS

| | | | | |
|---|---|---|---|---|
| 4,493,026 A | * | 1/1985 | Olnowich | ................. 711/128 |
| 5,737,752 A | * | 4/1998 | Hilditch | ................. 711/144 |
| 5,749,087 A | * | 5/1998 | Hoover et al. | ................. 711/133 |
| 5,802,574 A | * | 9/1998 | Atallah et al. | ................. 711/144 |
| 6,049,852 A | * | 4/2000 | Oba et al. | ................. 711/145 |

* cited by examiner

*Primary Examiner*—Glenn Gossage
(74) *Attorney, Agent, or Firm*—Klarquist Sparkman Campbell Leigh & Whinston

(57) ABSTRACT

An associative cache and method for replacing data entries in the associative cache by marking input-output (IO) device entries with an IO state. The IO state of a data entry may be indicated by a status or state tag. When valid data entries in a cache must be replaced to make way for new data, entries marked with an IO state are replaced first. This order of replacement improves the cache hit rate by non-IO agents such as data processors by preserving their data entries in the cache. If no valid data entries in the associative cache are marked with an IO state, the method reverts to conventional replacement algorithms such as random or least-recently-used (LRU) to determine which data will be replaced.

20 Claims, 5 Drawing Sheets

ASSOCIATIVE CACHE AND METHOD FOR REPLACING DATA ENTRIES HAVING AN IO STATE

FIELD OF THE INVENTION

This invention relates generally to cache replacement algorithms in computer systems. More particularly, this invention relates to a method and apparatus for minimizing the cache miss rate as cache data entries from input/output (IO) devices replace other entries in a cache.

BACKGROUND OF THE INVENTION

A cache is the name generally given to the first level of memory hierarchy in a computer system encountered by an address once it leaves the CPU of a data processor. Caches store recently-used data and instructions ("data"), thereby reducing the time otherwise required to access the data from slower, lower levels of the hierarchy such as main memory or secondary storage.

Caches contain a number of block frames, each of which can store a memory block (a group of data bytes), and can be organized in a number of ways, such as direct mapped, fully associative, and set associative. In a direct-mapped cache, a memory block can only be stored in a specific block frame in the cache. In a fully associative cache, a memory block can be stored in any block frame in the cache. A set associative cache, which has features of both direct-mapped and fully associative caches, allows a memory block to be stored anywhere within a set of block frames within the cache. The number of block frames within a set are known as ways. A four-way set associative cache, for example, has four block frames per set.

Caches improve system performance because of the "principle of locality," which holds that most computer programs do not access all data uniformly. Instead, most programs re-use the same data they have used recently. A cache stores this recently-used data in high-speed memory so it is available for re-use. The data processor then first looks to the cache for data before seeking it elsewhere. If the data sought is stored in the cache, a cache hit occurs and the data processor accesses it from the cache. If the data is not stored in the cache, a cache miss occurs and the data processor proceeds through the memory hierarchy to fetch the data from another source. In the process of fetching the data for the processor, a copy is stored in the cache for possible re-use.

A cache, however, has a finite size and at some point will completely fill with entries. On the next cache miss, the cache controller must then select an existing cache entry to be replaced by the newly sought data. The method for replacing entries is referred to as a cache replacement algorithm. Well known replacement algorithms include random and least-recently-used (LRU) methods.

While these and other known replacement algorithms work in most circumstances, they do not distinguish data transfers by requestor type (CPU or IO agent). Where such algorithms are used, they will replace currently cached non-IO data with IO data as significant IO data is transferred through the cache. The cache hit rate for non-IO requesters of the cache, such as data processors, then falls significantly. The cache, in effect, becomes unavailable to processors during the IO data transfer. For example, when a processor requests a desired block that has been replaced by an IO request, the cache has a miss. It must then replace the IO-requested block (or another) in the set to again make room for the processor-requested block. That cache miss would have been a cache hit had the IO request not earlier replaced the processor-requested block. Thus computer system performance suffers as the processors must first seek their data from elsewhere in the memory hierarchy than the cache, such as in main memory or secondary storage.

An objective of the invention, therefore, is to provide a method for replacing IO and non-IO data in a cache with a minimal reduction of system performance.

SUMMARY OF THE INVENTION

A method of replacing data entries in an associative cache with new data comprises the following steps. Data entries in the ways of the cache are checked to determine which, if any, was last accessed by an IO agent. If such a data entry is identified, the checked data entry is replaced with the new data. If no such data entry is identified, then a data entry is selected according to another cache replacement algorithm such as random or least-recently-used and the selected data entry is replaced.

In one aspect of the invention, the data entries are first checked to determine if any is invalid and, if so, the invalid entry is replaced with the new data before checking for a data entry having an IO state.

In another aspect of the invention, each data entry corresponds to a remote cache tag and the step of checking the data entry comprises checking a state tag portion of the cache tag. The state tag portion may comprise an n-bit tag.

The foregoing and other objects, features, and advantages of the invention will become more apparent from the following detailed description of a preferred embodiment which proceeds with reference to the following drawings.

DETAILED DESCRIPTION OF A PREFERRED EMBODIMENT

Although the invention as described and shown herein is embodied in a multinode computer system, it should be understood that this is only a preferred embodiment of the invention. The invention can be implemented in any computer system that uses an associative cache to store data being transferred to or from an IO device.

Figure 1:
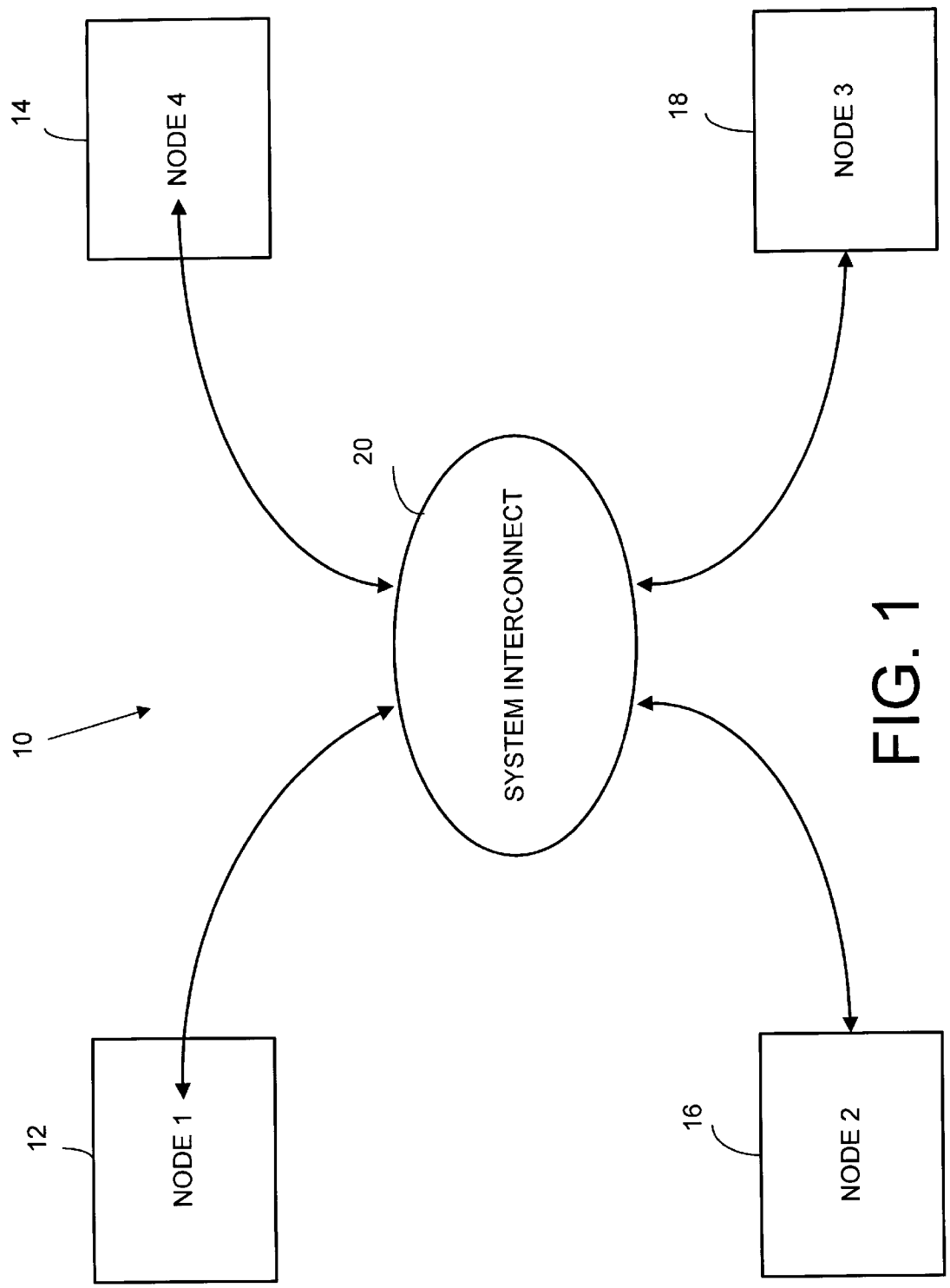
FIG. 1 is a block diagram of a multinode, multiprocessor computer system in accordance with the invention.

FIG. 1 is a block diagram of a multinode, multiprocessor computer system 10 with which the invention may be used. System 10 uses a computer architecture based on Distributed-Shared Memory (DSM). Four nodes 12–18 are shown connected by a system interconnect 20 that permits any node to communicate with any other node. Specifically, the purpose of interconnect 20 is to allow processors in any node to access the memory resident in any other node with cache coherency guaranteed. System interconnect 20 is a switch-based network that uses the Scalable Coherent Interface (SCI) interconnection mechanism. SCI is an Institute of Electrical and Electronic Engineers (IEEE) approved standard, or protocol (1596), well documented in a number of publications including IEEE Std 1596-1992 (2 Aug. 1993) and *Multiprocessor interconnection using SCI*, a Master Thesis by Ivan Tving, DTH ID-E 579 (1994), both of which are hereby incorporated by reference. Other interconnection mechanisms could, of course, be used.

Figure 2:
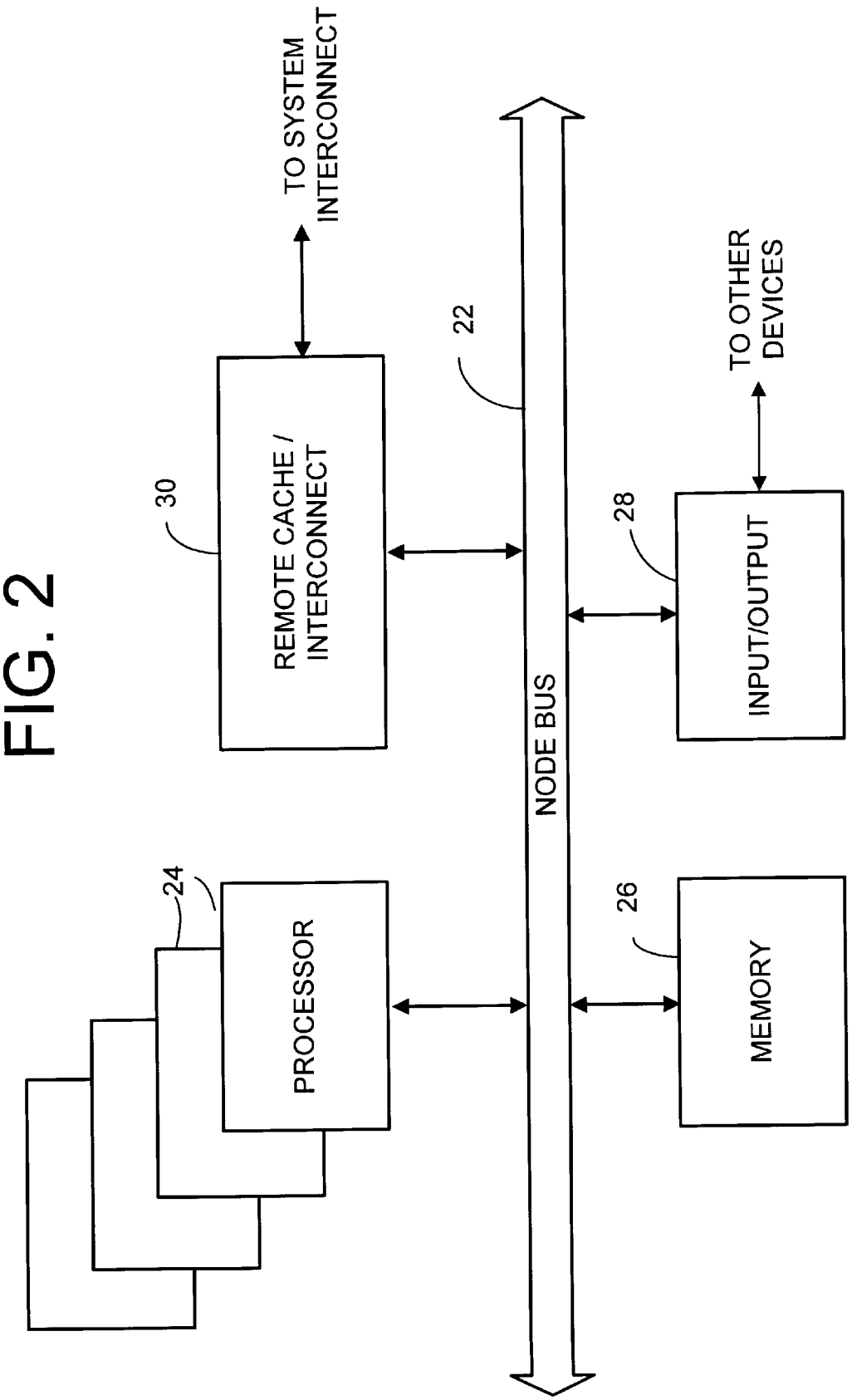
FIG. 2 is a block diagram of one of the nodes of the computer system of FIG. 1.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12–18, such as in a ring topology, in arbitrary topologies through switches, or in a combination of both. The links can be wired or wireless (optical, radio frequency, (RF) etc.) depending upon system performance needs. Additional topologies are described in "Interconnect Topologies with Point-To-Point Rings," Ross E. Johnson and James E. Goodman, December 1991, Computer Sciences Technical Report #1058, University of Wisconsin—Madison A block diagram of node 12 of system 10 is shown in FIG. 2. The node includes a conventional symmetrical multiprocessor (SMP) node bus 22 for connecting multiple data processors 24 to local memory 26. For clarity, nodes 12–18 may be referred to as home (i.e., local) nodes or remote nodes in certain circumstances. A home node is one whose local memory stores a memory block of interest (i.e., the address of the memory block falls within the address range supported by the home node's local memory); all of the other nodes are then remote nodes with respect to that memory block. Additionally, a node may be a requesting node or a responding node. A requesting node is one requesting data; a responding node is one furnishing such data. Input/output (I/O) device 28, which is also connected to bus 22, connects the node to devices outside computer system 10 for communicating information between the computer system and the outside world. I/O device 28 may be of conventional design and includes means for connecting the node (and hence system 10) to personal computers, local area networks, etc., that wish to utilize the power of the multinode computer system. To connect node 12 to the other nodes in the system, the node includes remote cache interconnect device 30. The device forms part of system interconnect 20 along with the physical links between nodes and the same devices on the other nodes of the computer system 10. In the present embodiment, device 30 is constructed to implement the SCI standard for data communication between the nodes, allowing a processor on one node to access data stored on another node. Device 30 also contains a remote cache in the present embodiment, although this combination is not required for the invention. The remote cache could as well be separate from the interconnect device.

Figure 3:
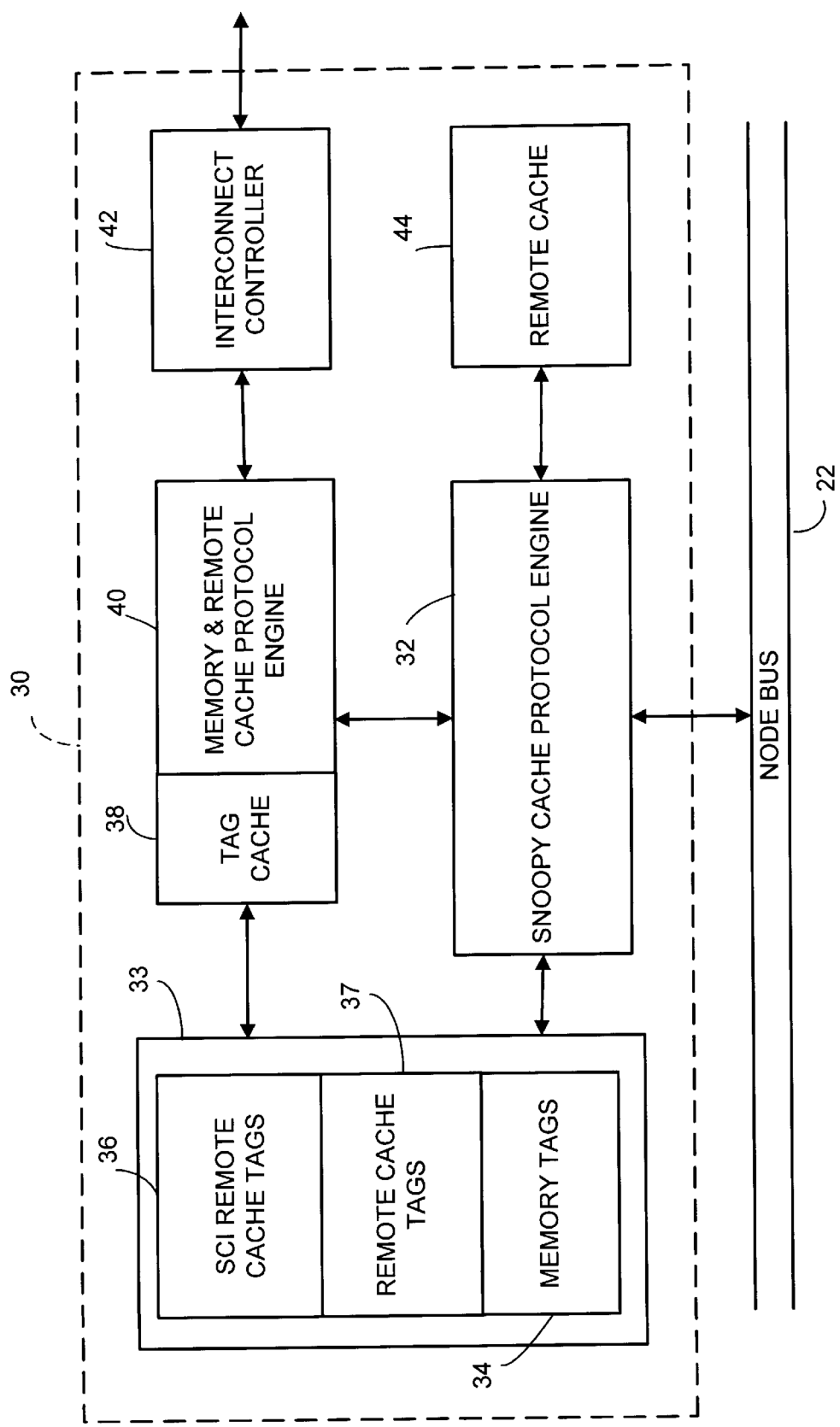
FIG. 3 is a block diagram of an interconnect device within the node of FIG. 2.

FIG. 3 is a block diagram showing the interconnect device 30 in more detail. The device includes a snoopy cache protocol engine 32; storage such as memory for memory tags 34 and remote cache tags 36 and 37; a tag cache 38; a memory & remote cache protocol engine 40; an interconnect controller 42; and a remote cache memory 44.

To maintain coherence among the remote caches in the nodes of computer system 10, the system uses a chained directory scheme defined in the SCI protocol. The chained directory is implemented as a doubly linked sharing list that keeps track of which caches share the same data. With this sharing list, remote caches can be notified when the data they share has been changed and thus is no longer valid. The elements of the sharing list are SCI remote cache tags 36, which are linked into the chained directory to indicate that the node's remote cache 44 contains a copy of the shared data. An SCI remote cache tag 36 contains a number of fields including the Address field, which identifies the memory block cached in the remote cache, and the Cache State field, which gives the state of the cache.

Figure 4:
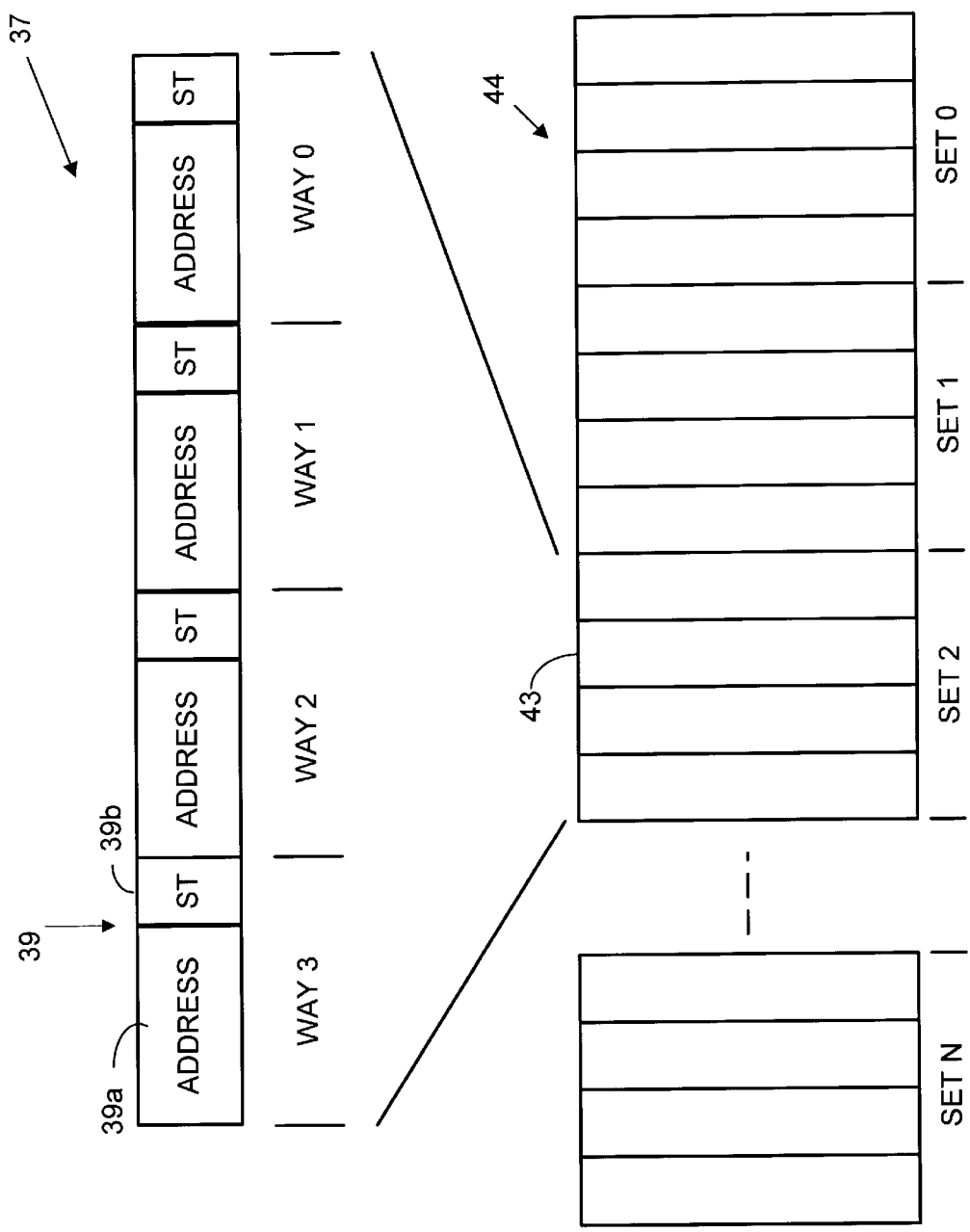
FIG. 4 is a diagram of a remote cache tag according to the invention and its relationship to an associative cache.

For rapid response to accesses from local processors 24 and IO device 28, a set of remote cache tags 37 (similar but not identical to tags 36) is also provided. FIG. 4 is a diagram of a remote cache tag 37 and its relationship to remote cache 44. Each 64-bit tag 37 is sub-divided into four 16-bit tags 39 corresponding to particular cache ways. Each tag 39 is further subdivided into a 3-bit state tag portion 39b and a 13-bit bus address tag portion 39a. Cache 44 in the present embodiment is a four-way, 128 k (kilobyte) set associative cache organized into 576-bit data lines, or blocks. Each tag 37 corresponds to a particular cache set such as set 2. Within each set are four ways (such as the way numbered 43) which correspond to tags 39. Remote cache tags 37, individual tags 39, and tag portions 39a and 39b can, of course, be any n-bit value, or be separate tags or multiple portions, depending upon how the invention is implemented. Cache 44 could be other n-way, even fully associative for the purposes of this invention.

During a remote cache tag lookup, a cache controller (not shown) within protocol engine 32 compares tags 37 against bus address bits received from the processor 24 or IO device 28. This comparison selects the appropriate cache set. Address tag portions 39a for each tag are then compared against the upper bus address bits to determine if desired data line is stored in one of the four ways of the cache set. If so, the state of the cache line is determined by the bits of the state tag portion 39b for the cache way containing the data line.

A cache way can have a number of states, indicated by the state tag bits. Table 1 summarizes the state and address cache tag encoding for the remote cache states that are pertinent to this embodiment of the invention.

TABLE 1

| State Tag Mnemonic | State Tag Value | Address Tag Value | Description |
| --- | --- | --- | --- |
| RDIO | 010 | Address | Remote cache data valid for node bus request. Data line last accessed by IO agent. |
| RDIO-HLD | 010 | Address | Remote cache data valid for node bus read requests. Data line last accessed by IO agent. Hold state guarantees forward progress for prefetched lines. |
| WRIO | 011 | Address | Remote cache data valid for all node bus requests (this node has only valid copy of data). Data line last accessed by IO agent. |
| WRIO-HLD | 011 | Address | Remote cache data valid for all node bus requests (this node has only valid copy of data). Data line last accessed by IO agent. Hold state guarantees forward progress for prefetched lines. |
| INV | 111 | 0x1fff | Remote cache data invalid for node bus accesses. |

The first four rows are states that indicate the last access to the cache line in the way was made by an IO agent such as IO device 28. Other IO states or bit values, of course, could be used.

Figure 5:
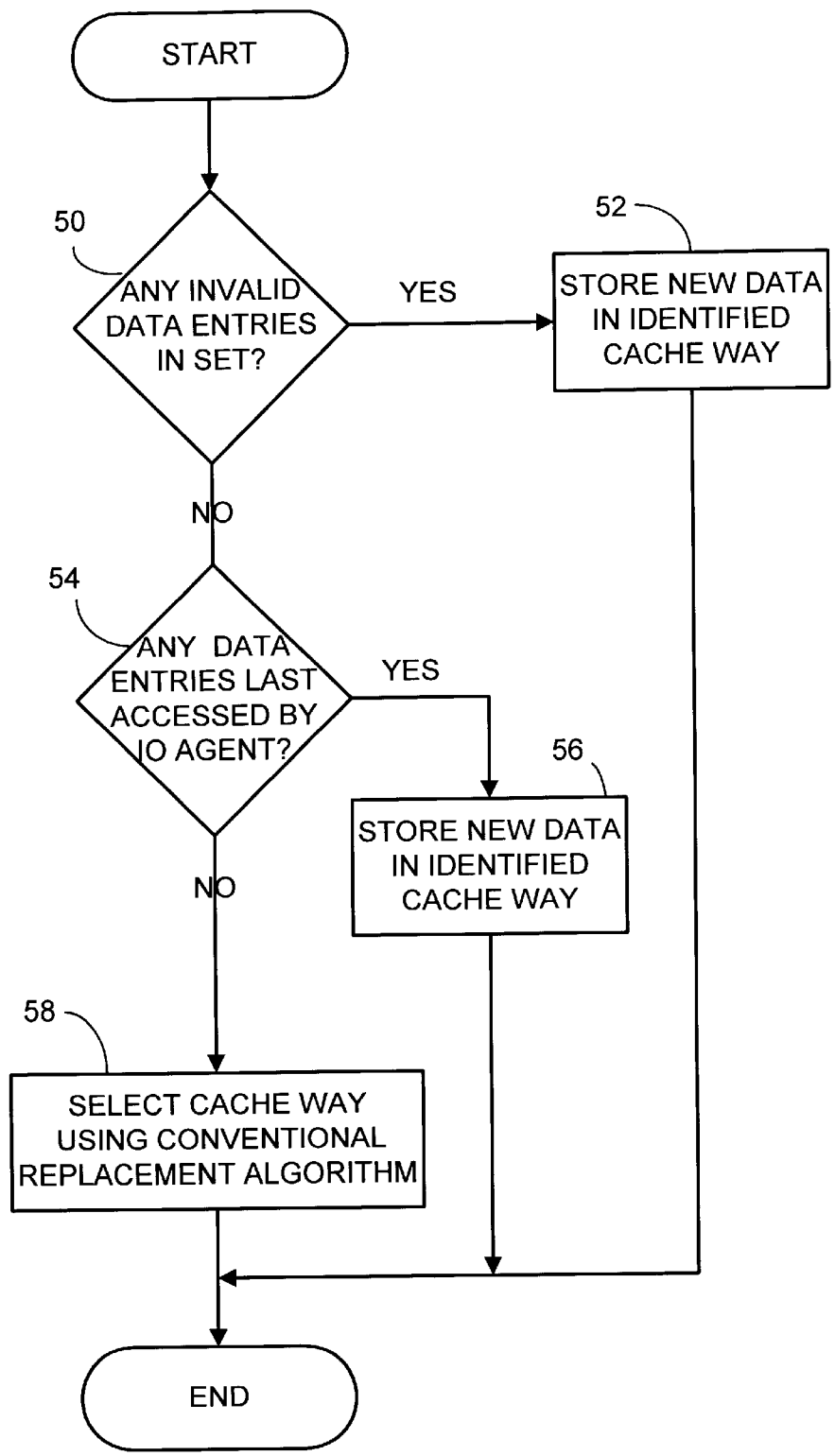
FIG. 5 is a flow chart of a method according to the invention for replacing data in an associative cache.

FIG. 5 is a flow chart of a method according to the invention for replacing a data entry in the way of an associative cache (such as cache 44) with new data. This method comes into play when an agent on node bus 22 such as a processor 24 or IO device 28 tries to access a remote memory line that is not currently cached. Under these circumstances, it becomes necessary to allocate a way in cache 44 for receipt of the new data. In the preferred embodiment, these steps are carried out by the cache controller within protocol engine 32.

Initially, the state tag portions 39b for the data entries in the ways of the selected cache set (such as the way numbers 43 in set 2) are checked to see if any data entries are invalid (step 50). The cache set (such as set 2 in FIG. 4) is determined by the address bits of the bus agent request, and the corresponding cache tag 37 is checked by examining the state tag portions 39b of each tag 39. If an entry with an invalid state is found, then its cache way is identified as a replacement target for storing the new data (step 52).

If no invalid data entries in the cache set are found, the data entries are then rechecked to determine which, if any, was last accessed by an IO agent. In the preferred embodiment, the check is done by examining the state tag portions 39b for the data entries to see if a tag indicates an IO state (such as RDIO or WRIO) (step 54). Other techniques for checking on last access may, of course, be used. By selecting data entries with IO states, the number of IO data entries is minimized since they are replaced before non-IO entries. This minimization reduces the impact of large IO data transfers through the cache by preserving the data entries frequently used by data processors 24. If a data entry has such an IO state, then its cache way is identified as the target for storing the new data (step 56).

If none of the data entries in the cache ways has an IO state, then an entry is selected as the target according to another, conventional cache replacement algorithm (step 58). Any of a number of well-known algorithms can be used, including but not limited to random replacement, least-recently-used, or the first entry encountered with a read (RD) or a write (WR) state.

Once stored in cache 44, through whatever route, the new data entry is marked with the appropriate state in state tag portion 39b. If the new data entry is IO data, for example, the entry is marked with an IO state.

To provide randomization in the cache way allocation, the order in which the tags 39 are examined in steps 50, 54, and 58 preferably changes each time a cache way is sought for replacement. An allocation counter within protocol engine 32 outputs a number that is incremented each time a cache way is allocated. The counter points to a "first" way for allocation. The cache controller then allocates the "first" way first, looking at the next cache way if necessary, and so on, causing the counter to wrap around as the ways are allocated. For example, if the counter contains a two, the state for the cache way 2 is first evaluated to determine if the way is available for allocation. If it is not (under whatever test is being applied), cache way 3 is evaluated, followed by cache way 0 and cache way 1. This technique thus checks the ways of the cache in pseudo-random fashion.

Having illustrated and described the principles of the invention in a preferred embodiment, it should be apparent to those skilled in the art that the preferred embodiment can be modified in arrangement and detail without departing from these principles. For example, the locations of the various tags, allocation logic and cache can be changed as desired to meet the needs of a particular implementation. Software aspects of the embodiment may be implemented in hardware and vice versa. The invention may be used in single or multiprocessor computer systems and with set, fully, or other associative-type caches.

In view of these and the many other possible embodiments to which the principles of the invention can be applied, it should be understood that the following claims, not the preferred embodiment, define the scope of the invention. We therefore claim as the invention all that comes within the spirit and scope of these claim.

We claim:

1. A method of replacing a data entry in a way of an associative cache with new data, the method comprising the following steps:
   selecting a set of ways within the cache, each way storing a data entry;
   checking if a data entry in a way of the set was last accessed by an input-output (IO) agent;
   if so, replacing the last accessed data entry with the new data;
   if not, selecting a data entry in a way of the set according to a different cache replacement algorithm; and
   replacing the selected data entry with the new data.

2. The method of claim 1 including, before checking if a data entry in a way of the set was last accessed by an input-output (IO) agent:
   checking if a data entry in a way of the set is invalid; and
   if so, replacing the invalid data entry in the way with the new data.

3. The method of claim 1 wherein the different cache replacement algorithm is a random replacement algorithm.

4. The method of claim 1 wherein the different cache replacement algorithm is a least-recently-used replacement algorithm.

5. The method of claim 1 wherein the checking step comprises checking a state tag corresponding to the data entry being checked.

6. The method of claim 1 wherein the checking step comprises checking the ways of the set in a pseudo-random fashion.

7. The method of claim 1 wherein the replacing steps include marking a state tag corresponding to the new data with an IO state if the new data is brought to the cache as a result of a request by an IO agent.

8. An associative cache comprising:
   cache data memory for storing cache data in one or more n-way associative sets; and
   cache tag memory for storing a cache tag for a way of a set, the cache tag including an address tag and a state tag corresponding to data stored in the way, the state tag having an input-output (IO) state to indicate that the corresponding stored data was last accessed by an IO agent.

9. The cache of claim 8 wherein the state tag comprises an n-bit value that indicates whether a last access to the stored data was made by an IO agent.

10. The cache of claim 8 wherein the cache tag comprises a 13-bit address tag and a 3-bit state tag.

11. The cache of claim 8 wherein the cache data memory is a 4-way associative cache and the cache tag memory is organized into larger cache tags subdivided into smaller cache tags each corresponding to a different way, the smaller cache tags accessible to determine if a state tag therein has an IO state.

12. The cache of claim 8 including a computer system wherein the cache is located.

13. A method of replacing a data entry in a way of an associative cache with new data, the method comprising the following steps:

selecting a set of ways within the cache, each way storing a data entry;

checking if a data entry in a way of the set is invalid;

if so, replacing the invalid data entry in the way with the new data;

if not, checking if a state tag corresponding to a data entry in a way of the set has an input-output (IO) state;

if a state tag corresponding to a data entry in a way of the set has an IO state, replacing the data entry with the new data and marking the state tag to reflect whether the new data was brought into the cache by request of an IO agent;

if no state tag corresponding to a data entry in a way of the set has an IO state, selecting a data entry in a way of the set according to a different cache replacement algorithm; and replacing the selected data entry in the way with the new data.

14. The method of claim 13 wherein the checking steps comprise checking the ways of the set in a pseudo-random fashion using a number generated by an allocation counter.

15. A method of replacing a data entry in a way of an associative cache with new data, the method comprising:

selecting a set of ways within the cache, each way storing a data entry;

checking if a data entry in a way of the set has an input-output (IO) state; and if so, replacing the data entry with the new data.

16. The method of claim 15 including:

if no data entry in a way of the set has an IO state, selecting a data entry in a way of the set according to a different cache replacement algorithm; and replacing the selected data entry with the new data.

17. The method of claim 15 wherein the IO state of a data entry is indicated by a state tag.

18. The method of claim 15 including, before checking if a data entry in a way of the set has an input-output (IO) state:

checking if a data entry in a way of the set is invalid; and if so, replacing the invalid data entry with the new data.

19. The method of claim 15 wherein the IO state of the data entry indicates that the data entry was last accessed by an IO agent.

20. An associative cache comprising:

cache data memory for storing data entries; and cache tag memory for storing a cache tag associated with a data entry stored in the cache data memory, the cache tag indicating if the associated data entry has an input-output (IO) state.

* * * * *